United States Patent
Wang et al.

(10) Patent No.: US 9,823,384 B1
(45) Date of Patent: Nov. 21, 2017

(54) MUD ACTIVATION MEASUREMENT WHILE DRILLING

(71) Applicant: SCHLUMBERGER TECHNOLOGY CORPORATION, Sugar Land, TX (US)

(72) Inventors: Jiaxin Wang, Katy, TX (US); Libai Xu, Katy, TX (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/248,879

(22) Filed: Aug. 26, 2016

(51) Int. Cl.
| | |
|---|---|
| *G01V 5/10* | (2006.01) |
| *G01F 1/00* | (2006.01) |
| *E21B 47/12* | (2012.01) |
| *E21B 47/00* | (2012.01) |
| *E21B 49/00* | (2006.01) |
| *E21B 47/10* | (2012.01) |

(52) U.S. Cl.
CPC .............. *G01V 5/101* (2013.01); *E21B 47/10* (2013.01); *E21B 47/12* (2013.01); *E21B 49/003* (2013.01); *G01F 1/00* (2013.01)

(58) Field of Classification Search
CPC ........ E21B 47/10; E21B 47/12; E21B 49/003; G01F 1/00; G01V 5/101
See application file for complete search history.

(56) References Cited

U.S. PATENT DOCUMENTS

| | | | | |
|---|---|---|---|---|
| 4,028,546 A | * | 6/1977 | Peelman | E21B 47/1015 250/265 |
| 4,032,778 A | * | 6/1977 | Paap | E21B 47/1015 250/264 |
| 4,032,779 A | * | 6/1977 | Arnold | E21B 47/1015 250/265 |
| 4,032,780 A | * | 6/1977 | Paap | E21B 47/1015 250/265 |
| 4,032,781 A | * | 6/1977 | Arnold | G01V 5/102 250/265 |
| 4,035,640 A | * | 7/1977 | Arnold | E21B 47/1015 250/265 |
| 4,047,028 A | * | 9/1977 | Arnold | E21B 47/1015 250/265 |

(Continued)

FOREIGN PATENT DOCUMENTS

CV    EP 0421844 A1 *  4/1991   ......... E21B 47/1015

OTHER PUBLICATIONS

Flanagan, et al, "A New Generation Nuclear Logging System," SPWLA 32nd Annual Logging Symposian, Jun. 16-19, 1991, 25 pp.

(Continued)

*Primary Examiner* — Mark R Gaworecki (57) ABSTRACT

A method for estimating a drilling fluid flow rate in a subterranean wellbore includes processing an acquired gamma ray spectrum in combination with standard elemental spectra and at least one standard oxygen activation spectrum to compute an oxygen activation yield. The oxygen activation yield is further processed to estimate a drilling fluid flow rate and or to infer a borehole diameter change or a lost circulation event. The gamma ray spectrum is acquired using a logging string employing a neutron source and a natural gamma ray sensor.

20 Claims, 6 Drawing Sheets

(56) References Cited

U.S. PATENT DOCUMENTS

| | | | | |
|---|---|---|---|---|
| 4,057,720 A | * | 11/1977 | Paap | E21B 47/1015 |
| | | | | 250/266 |
| 4,071,757 A | * | 1/1978 | Arnold | E21B 47/1015 |
| | | | | 250/265 |
| 4,268,965 A | | 5/1981 | Askew | |
| 4,737,636 A | * | 4/1988 | Smith, Jr. | E21B 47/1015 |
| | | | | 250/269.7 |
| 5,094,808 A | | 3/1992 | Meeh | |
| 5,219,518 A | | 6/1993 | McKeon et al. | |
| 5,343,041 A | * | 8/1994 | Ruscev | G01V 5/101 |
| | | | | 250/269.6 |
| 5,404,752 A | * | 4/1995 | Chace | E21B 47/1015 |
| | | | | 250/268 |
| 5,461,909 A | | 10/1995 | Arnold | |
| 5,949,069 A | * | 9/1999 | Chace | E21B 47/1015 |
| | | | | 250/256 |
| 7,081,616 B2 | | 7/2006 | Grau et al. | |
| 8,093,550 B2 | | 1/2012 | Stoller | |
| 8,809,798 B2 | * | 8/2014 | Mendez | G01V 5/12 |
| | | | | 250/395 |
| 2011/0198078 A1 | * | 8/2011 | Harrigan | E21B 49/008 |
| | | | | 166/254.2 |
| 2012/0056083 A1 | * | 3/2012 | Inanc | G01V 5/101 |
| | | | | 250/269.1 |
| 2015/0090870 A1 | * | 4/2015 | Stoller | G01V 5/101 |
| | | | | 250/269.7 |
| 2016/0273336 A1 | * | 9/2016 | Quintero | G01V 5/101 |
| 2017/0168192 A1 | * | 6/2017 | Vasilyev | G01V 5/102 |

OTHER PUBLICATIONS

Xu, et al., "Spectral Gamma Ray Measurement While Drilling", SPWLA 56th Annual Logging Symposium, Jul. 18-22, 2015, 17 pp.

* cited by examiner

MUD ACTIVATION MEASUREMENT WHILE DRILLING

CROSS REFERENCE TO RELATED APPLICATIONS

None.

FIELD OF THE INVENTION

Disclosed embodiments relate generally to nuclear logging operations and more specifically to measurement while drilling (MWD) measurements that make use of the nuclear activation of downhole drilling fluids.

BACKGROUND INFORMATION

Natural gamma ray logging is one of the most common logging techniques in the oil and gas industry. Such logging operations measure the naturally occurring gamma radiation emitted by a subterranean formation, primarily from potassium, uranium, and thorium containing minerals in the formation. Both total gamma ray and spectral gamma ray sensors are commonly employed. Total gamma ray sensors measure the total number of detected gamma rays with an energy above a predetermined threshold. Spectral gamma ray sensors measure the energy spectrum of the emitted gamma rays and may be used to determine the weight concentrations of potassium, uranium, and thorium in the formation.

In operations in which the tool string further includes a neutron source, such as a pulsed neutron generator or a chemical neutron source as found in common nuclear logging tools, drilling fluids (mud) in the borehole may be activated by the generated neutrons. Such activated mud is known to emit gamma rays that may be detected by a natural gamma ray sensor.

SUMMARY

A method for estimating a drilling fluid flow rate in a subterranean wellbore is disclosed. The method includes deploying a logging string in a subterranean wellbore. The logging string includes a neutron source and a natural gamma ray sensor. Neutrons are emitted by the neutron source and a gamma ray spectrum is acquired by the gamma ray detector. The acquired gamma ray spectrum is processed in combination with standard elemental spectra and at least one standard oxygen activation spectrum to compute an oxygen activation yield. The oxygen activation yield is further processed to estimate a drilling fluid flow rate and or to infer a borehole diameter change or a lost circulation event.

The disclosed embodiments may provide various technical advantages. For example, disclosed embodiments may provide a method for measuring a drilling fluid flow rate from mud (e.g., oxygen) activation intensity. In certain embodiments the mud activation in both the drill collar (down flow) and in the borehole annulus (up flow) may be evaluated to infer a change in borehole conditions such as a change in borehole diameter or a lost circulation event.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
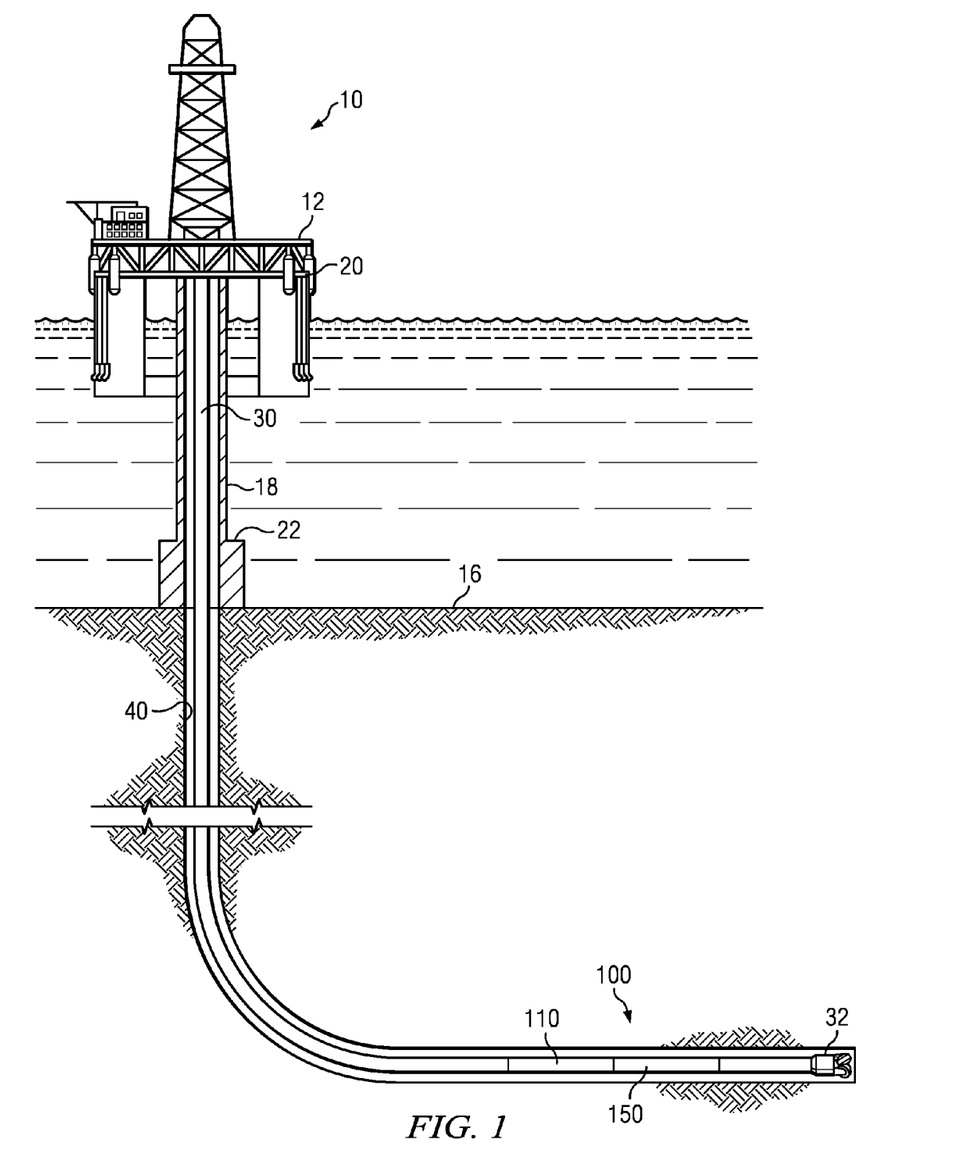
FIG. 1 depicts one example of a drilling rig on which disclosed logging string and logging method embodiments may be utilized.

FIG. 1 depicts one example embodiment of a nuclear logging string 100 in use in an offshore oil or gas drilling assembly, generally denoted 10. In FIG. 1, a semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and the nuclear logging string 100. Embodiments of the nuclear logging string 100 include at least one neutron source and at least one gamma ray sensor. For example, in the depicted embodiment, logging string 100 includes a neutron logging tool 110 including a neutron source and a gamma ray logging tool 150 including a gamma ray sensor. Drill string 30 may further include, for example, a downhole drilling motor, a mud pulse telemetry system, a steering tool, and/or one or more of numerous other measurement while drilling (MWD) and logging while drilling (LWD) sensors for sensing downhole characteristics of the borehole and the surrounding formation. The disclosed embodiments are not limited in these regards.

It will be understood that the deployment depicted on FIG. 1 is merely an example for the purposes of describing the disclosed embodiments. It will be further understood that methods in accordance with the disclosed embodiments are not limited to use in offshore drilling operations, but are equally well suited for use with any kind of subterranean drilling operation, either offshore or onshore.

Figure 2A:
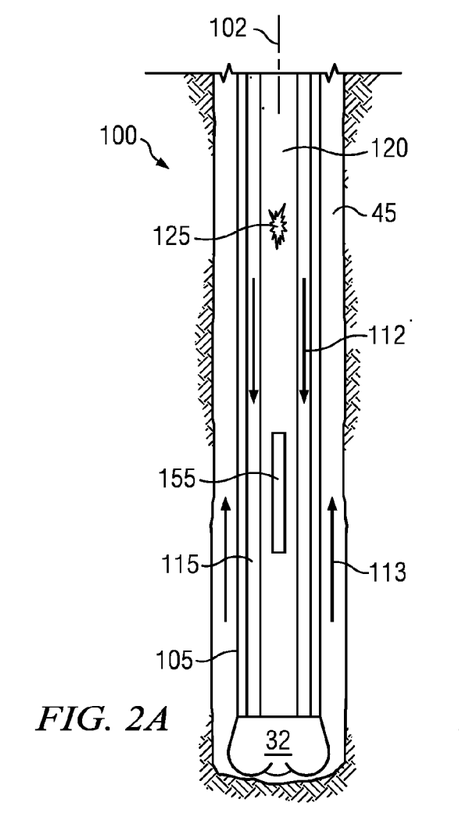
FIGS. 2A and 2B depict mandrel (2A) and chassis (2B) based embodiments of the nuclear logging string shown on FIG. 1.
Figure 2B:
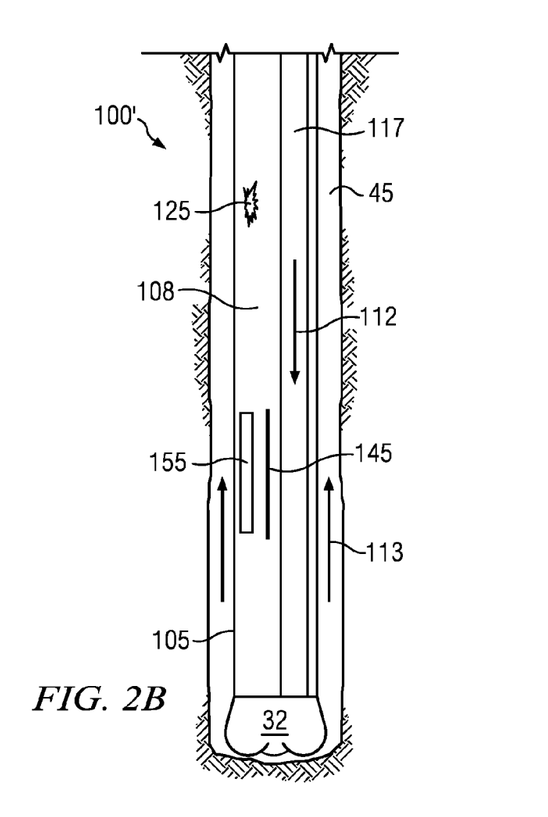

FIGS. 2A and 2B depict mandrel (2A) and chassis (2B) based embodiments of nuclear logging string 100. In FIG.

2A logging string 100 includes a central mandrel 120 on which the neutron source 125 and the gamma ray detector 155 are deployed. In the depicted embodiment, the mandrel 120 and the gamma ray detector 155 are substantially coaxial with a longitudinal axis 102 of the string 100. Drilling fluid is pumped downhole 112 through an annular flow channel 115 (radially between mandrel 120 and drill collar 105) to the bit 32 and flows upwards 113 through wellbore annulus 45.

In FIG. 2B logging string 100' includes a neutron source 125 and a gamma ray detector 155 deployed off axis in a drill collar 105 or tool chassis 108. Drilling fluid is pumped downhole 112 through an off axis channel 117 and flows upwards 113 through wellbore annulus 45. Optional shielding 145 may be provided between the gamma ray detector 155 and the channel 117.

With continued reference to FIGS. 2A and 2B, neutron source 125 may include substantially any suitable neutron source, for example, including a sealed chemical source or an electrical source. A suitable chemical source of neutrons may include an alpha-emitter mixed with beryllium such as the americium-241/beryllium chemical source. The neutron source 125 may also include the californium-252 chemical source. Suitable electrical neutron sources may be substantially continuous or pulsed and commonly make use of the deuterium-tritium (D-T) nuclear reaction, the deuterium-deuterium (D-D) nuclear reaction, and/or the tritium-tritium (T-T) nuclear reaction for example. The gamma ray detector may include substantially any suitable gamma ray detector, for example, including a sodium iodide (NaI) scintillator crystal and a photomultiplier.

Figure 3:
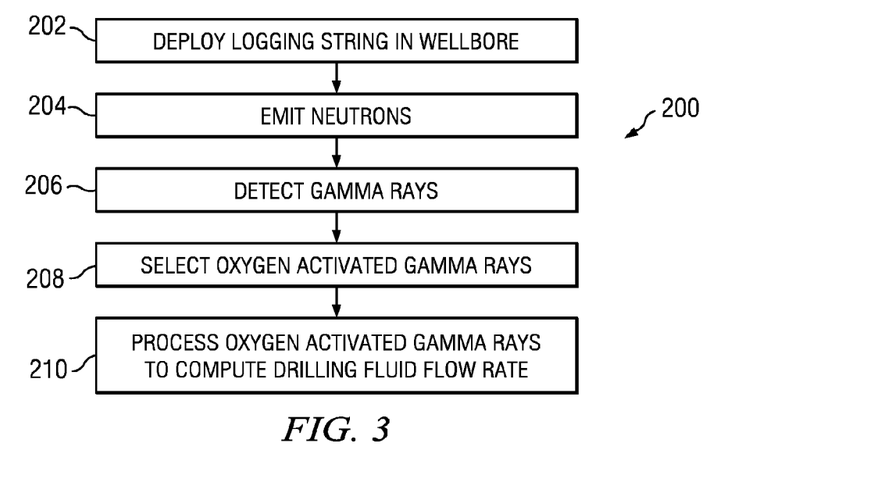
FIG. 3 depicts a flow chart of one disclosed method embodiment.

FIG. 3 depicts a flow chart of one disclosed method embodiment 200. An LWD tool string including a neutron source and a gamma ray sensor is deployed in a subterranean wellbore at 202. Neutrons are emitted into the wellbore at 204 thereby activating the drilling fluid (inducing the drilling fluid to emit gamma rays as described in more detail below). Gamma rays are detected at 206. The detected gamma rays may include both natural gamma rays emitted by the formation and "activation" gamma rays emitted by the activated drilling fluid. Activation gamma rays are selected at 208 and processed at 210 to estimate a drilling fluid flow rate.

As is known to those of ordinary skill in the art, natural gamma ray measurements are intended to measure the naturally occurring gamma rays emitted by an earth formation and may be used, for example, to determine weight concentrations of potassium, uranium, and thorium in the formation. Natural gamma ray measurements are often affected by induced radioactivity, for example, due to oxygen activation in drilling fluids when the drilling fluids are activated by a nearby neutron source.

Oxygen activation is a nuclear phenomenon in which oxygen $^{16}O$ is activated by high energy neutrons to produce a nitrogen isotope $^{16}N$. The $^{16}N$ isotope decays back to $^{16}O$ with a half-life of about 7 seconds. A large fraction of the decays will result in the emission of a 6.13 MeV gamma ray. When oxygen atoms in the drilling fluid are activated, the corresponding gamma rays may be detected by the natural gamma ray detector in the logging string. For example, oxygen activation may increase the total number of gamma rays detected and the total number of gamma rays detected having an energy above a threshold such as 3 MeV.

Figure 4:
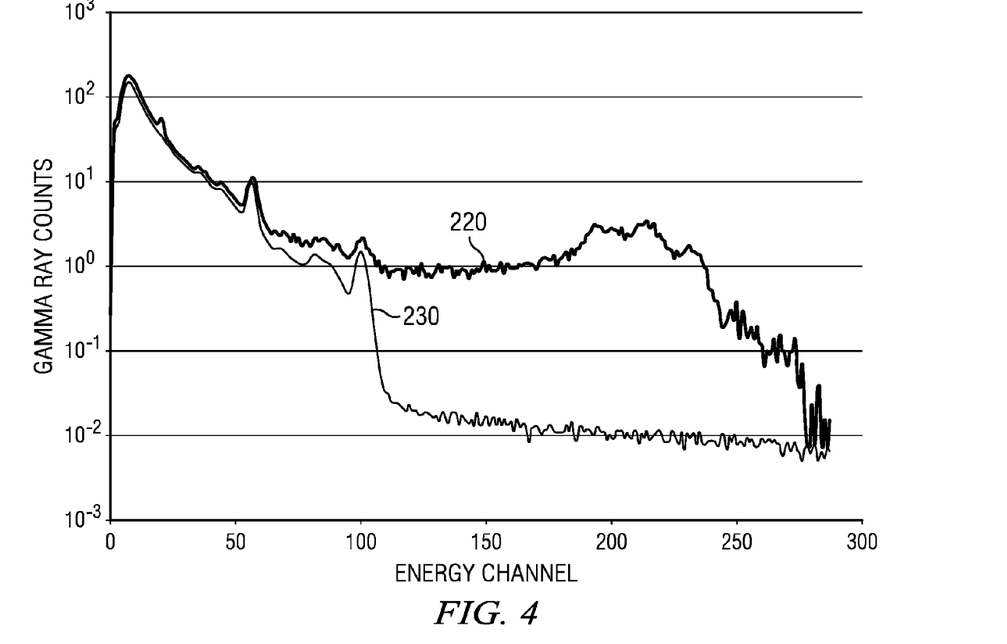
FIG. 4 depicts gamma ray spectra for a test granite formation with and without oxygen activation.

FIG. 4 depicts gamma ray spectra for a granite test formation with 220 and without 230 oxygen activation. The spectra are depicted as plots of gamma ray counts (or count rates) on the vertical axis versus energy channel on the horizontal axis (in which the detected gamma ray energy increases with increasing channel number). Note that oxygen activation significantly increases the received gamma ray counts at energies greater than about 3 MeV. In the depicted example, oxygen activation results in about a 100 times increase in the number of gamma rays having energies greater than about 3 MeV. Thus, for certain embodiments, the oxygen activation may be described mathematically as follows $O_x = C \cdot GRH$, where $O_x$ represents the intensity (or number of detected gamma rays) of the induced oxygen activation, GRH represents the gamma ray counts above a threshold (e.g., 3 MeV), and C represents a conversion coefficient that may be determined via experimentation or mathematical modeling.

In spectral gamma ray measurements, oxygen activation (a type of mud activation) may also change the shape of the gamma ray spectrum, particularly at higher energies (e.g., as described above). The contribution of oxygen activation to the measured spectra may be evaluated using spectral processing techniques. For example, a measured spectrum may be evaluated using a linear combination of known (or otherwise predetermined) standard spectra to determine the elemental contributions of potassium, uranium, and thorium as well the contribution(s) of oxygen activation. In certain embodiments, two distinct (first and second) standard spectra may be used to represent the oxygen activation, for example, including (i) a standard down flow activation spectrum and (ii) a standard up flow activation spectrum as described in more detail below. Using first and second standard spectra may account for spectral shape differences between gamma rays generated in the mud channel (down flow) versus gamma rays generated in the annulus (up flow). A weighted least squares fitting routine may be used to combine the standard spectra and estimate the elemental and oxygen activation contributions, for example, $O_x$ when a single oxygen activation standard spectrum is used or $O_{x\_down}$ and $O_{x\_up}$ when standard down flow and up flow oxygen activation spectra are used.

In another embodiment, the first standard oxygen activation spectrum may include, for example, a mixed spectrum (e.g., made up of an average or weighted average of the down flow and up flow standard spectra) and the second standard oxygen spectrum may include a difference between the down flow and up flow standard spectra. Such spectra may be linear combinations of the down flow and up flow standard oxygen activation spectra.

Spectral gamma ray measurements may be made over substantially any suitable number of energy windows. In one embodiment a measured gamma ray spectrum may include a small number of broad energy windows, for example from about three to about five windows. In another embodiment a measured gamma ray spectrum may include a large number of fine energy channels, for example including 128 or more channels. The disclosed embodiments are not limited in this regard.

Figure 5A:
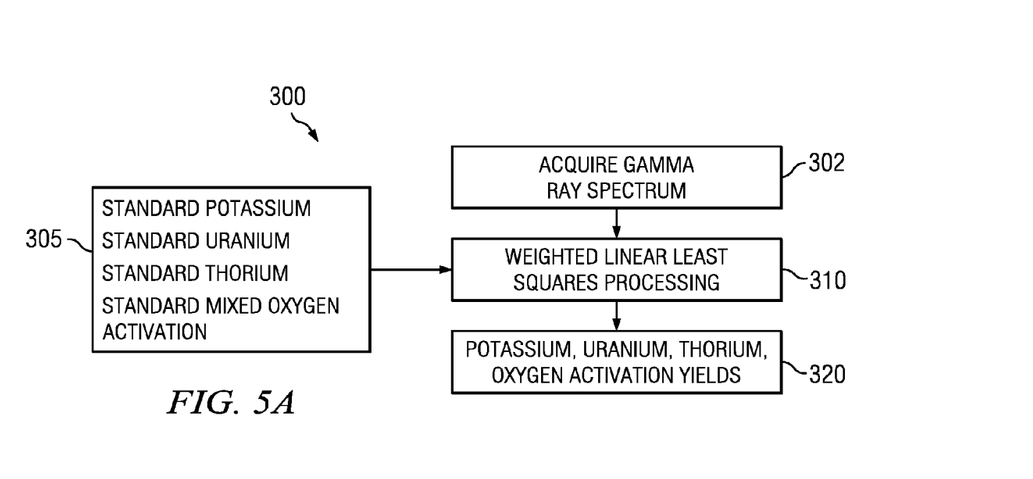
FIGS. 5A and 5B depict example fast and slow loop processing algorithms used to evaluate measured gamma ray spectra for oxygen activation.
Figure 5B:
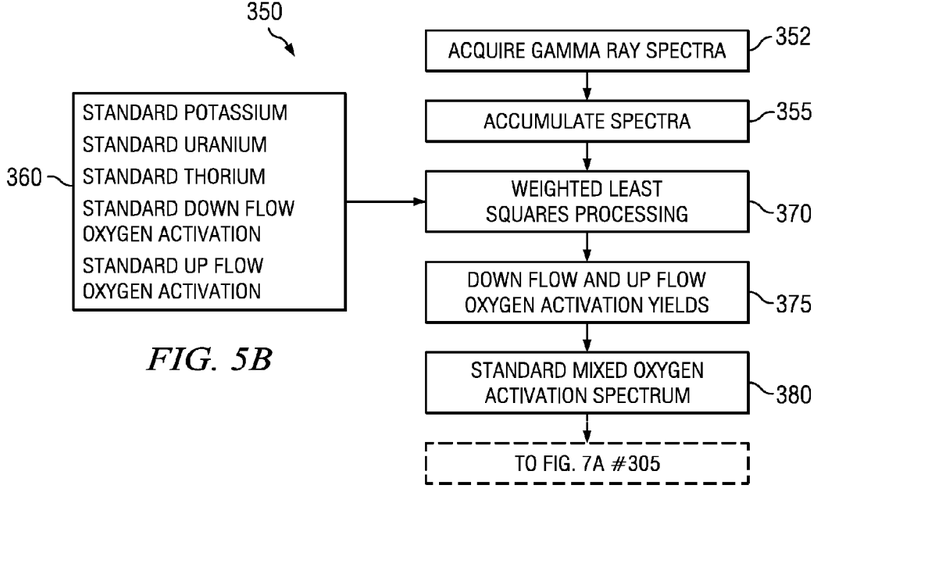

FIGS. 5A and 5B depict example fast and slow loop processing algorithms 300 and 350 used to evaluate measured gamma ray spectra for oxygen activation. In FIG. 5A an acquired gamma ray spectrum 302 is processed in combination with standard elemental potassium, uranium, and thorium standard spectra and a standard mixed oxygen activation 305 using a weighted linear least squares analysis at 310 to obtain potassium, uranium, thorium, and oxygen activation yields (or counts) at 320.

In FIG. 5B acquired gamma ray spectra 352 are accumulated at 355 (i.e., stacked or summed) to obtain an average spectrum over a predetermined time interval. For example, gamma ray spectra (each of which may be acquired at 352 in about 10 seconds) may be accumulated for about 10 to 20 minutes at 355 to obtain the average spectrum. The accumulated gamma ray spectrum is processed in combination with potassium, uranium, and thorium elemental standard spectra as well as first and second standard oxygen activation spectra (depicted at 360) using a weighted least squares analysis at 370 to compute first and second oxygen activation yields at 375. The down first and second oxygen activation yields may be further processed (e.g., via computing a ratio) to further compute a standard mixed oxygen activation spectrum at 380. The standard mixed oxygen activation spectrum may then be optionally input to block 305 of the fast loop 300.

The use of one oxygen activation standard (the mixed standard) in the fast loop may (in certain embodiments) provide for improved measurement precision as compared to using two standards. The mixed standard may be adjusted using the slow loop to match drilling conditions. For example, when drilling conditions change, the slow loop analysis may detect the change in a changing ratio of down flow to up flow yields and then may in turn update the mixed standard oxygen activation spectrum based on the changing ratio. In this way the mixed standard oxygen activation spectrum may be tuned to more accurately match the drilling conditions and thereby produce more accurate potassium, uranium, and thorium yields.

It will be appreciated that the fast and slow loops 300 and 350 depicted on FIGS. 5A and 5B are merely examples. The disclosed embodiments are not limited to the use of interconnected fast and slow processing loops as described above. In alternative embodiments, a measured gamma ray spectrum (or an accumulated spectrum) may be evaluated (i) for a mixed oxygen activation yield using a single oxygen activation standard spectrum or (ii) for first and second oxygen activation yields using first and second standard spectra.

It will further be appreciated that substantially any suitable standard spectra may be utilized. For example, standard potassium, uranium, and thorium spectra are well known in the art. Standard borehole potassium spectra are also known in the art. These standard spectra may also be determined empirically (e.g., by making natural gamma ray measurements in an artificial borehole formed in standard formations including known concentrations of potassium, uranium, and thorium). Should other radioactive elements be present, as could be the case when using radioactive tracers or when drilling in formations containing radioactive contaminants, additional standard spectra may be used.

Standard oxygen activation spectra may also be determined empirically. These spectra are generally dependent on the gamma ray tool or gamma ray sensor configuration, (e.g., chassis or mandrel, as well as the detailed construction of the tool section in the vicinity of the gamma ray detector), and the borehole diameter. The standard spectra may also be dependent on the type of drilling fluid used (i.e., its composition and density). It may therefore be advantageous to obtain standard spectra for several possible configurations.

In one embodiment, a logging string including a spectral gamma ray detector may be deployed in a borehole in a laboratory test formation. Drilling fluid may be pumped past a neutron source and down through the logging string. A measured gamma ray spectrum may be taken to be a down flow standard spectrum. The drilling fluid may also be pumped past the neutron source and up through the borehole annulus to measure an up flow standard spectrum. Moreover, drilling fluid may be pumped past the neutron source, down through the logging string, and then up through the borehole annulus to obtain a mixed oxygen activation standard spectrum.

Figure 6:
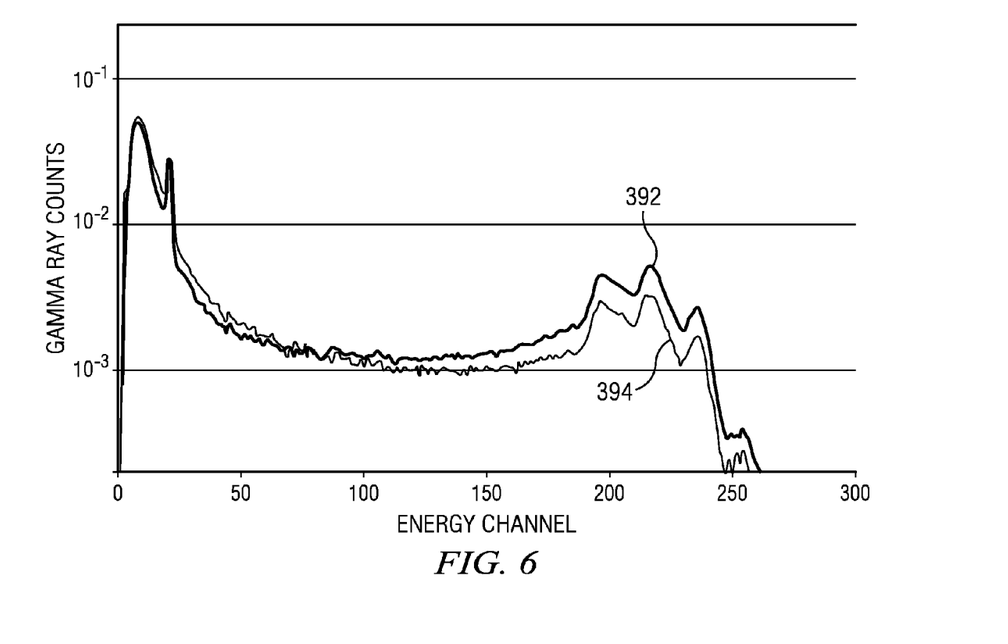
FIG. 6 depicts example standard down flow and up flow oxygen activation gamma ray spectra for a mandrel based logging string (e.g., as depicted on FIG. 2A).

FIG. 6 depicts example standard down flow 392 and up flow 394 oxygen activation gamma ray spectra for a mandrel based logging string (e.g., as depicted on FIG. 2A). The spectra are depicted as plots of normalized gamma ray counts on the vertical axis versus energy channel on the horizontal axis (in which the gamma ray energy increases with increasing channel number). The down flow standard spectrum has higher normalized counts at higher energies while the up flow standard spectrum has higher normalized counts at lower energies. The spectra depicted on FIG. 6 may be used, for example, at step 208 of FIG. 3 to determine the oxygen activation yield(s) for a measured gamma ray spectrum.

The intensity of the induced oxygen activation generally depends on the duration of mud irradiation (the activation time) and the length of time it takes for the mud to travel from the neutron source to the gamma ray detector (the decay time). Owing to the short half-life of the oxygen activation (about seven seconds), the measured intensity of the induced oxygen activation $O_x$ (or $O_{x\_}$down and $O_{x\_}$up) tends to be sensitive to several downhole factors that can affect the activation time and/or the decay time. These factors include the volumetric flow rate (or total fluid velocity) and the borehole diameter. BHA geometric factors such as the distance between the neutron source and the gamma ray detector, the distance between the gamma ray detector and the drill bit, the mud channel diameter, and other factors can also affect the activation time and/or the decay time. However, once a BHA configuration is selected, these parameters are generally fixed and known.

Turning again to FIGS. 2A and 2B, it will be appreciated that a mandrel based gamma ray detector (as depicted on FIG. 2A) is generally more sensitive to down flow activation and less sensitive to up flow activation (as the gamma ray sensor is in closer proximity to the downwardly flowing drilling fluid). A chassis based gamma ray sensor (as depicted on FIG. 2B) is generally more sensitive to up flow activation and less sensitive to down flow activation (as the gamma ray sensor is in closer proximity to the upwardly flowing drilling fluid and may optionally be shielded from the downwardly flowing fluid).

Figure 7:
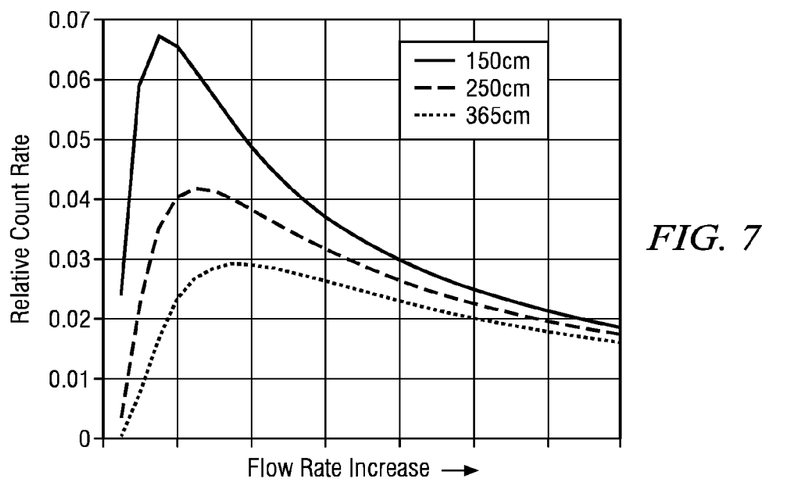
FIG. 7 depicts a plot of the relative oxygen activation count rate (or the total number of counts detected in a predetermined time window) versus drilling fluid flow rate for three different neutron source detector axial spacings (150, 250, and 365 cm).

FIG. 7 depicts a plot of the relative oxygen activation count rate (or the total number of counts detected in a predetermined time window) versus drilling fluid flow rate for three different neutron source detector axial spacings (150, 250, and 365 cm). For each configuration, the count rate increases rapidly with flow rate until a maximum is reached. The count rate then decreases monotonically with further increasing flow rate. The flow rates during a drilling operation are generally in the monotonically decreasing region of the plot. This is likely due to the activation time and the decay time being less than the half-life of the activated oxygen. The activation time may be estimated as the path length over which the neutron source activates the fluid (e.g., about 1 foot) divided by the speed at which the mud passes the neutron source. In various suitable configurations, the activation time may be of the order of 10 to 100 milliseconds which is less than the half-life (about 7 seconds). As the flow rate increases the activation time tends to decrease leading to a lower activation. Moreover, the decay time from activation to detection, assuming a distance of about 20 feet may be less than about one second such that the activation decreases minimally between the region of activation and the detector.

Based on FIG. 7 the volumetric flow rate of drilling fluid may be expressed mathematically as a function of the oxygen activation yield (or count rate), for example, as follows:

$$Q = f(O_x) \quad (1)$$

where Q represents the volumetric flow rate and f(·) indicates the functional relationship between the oxygen activation yield and the volumetric flow rate. The functional relationship f(·) depends on the BHA configuration (e.g., as depicted the distinct curves in FIG. 5), including the mud flow channel diameter, the distance between the neutron source and the gamma ray detector, the distance between the gamma ray detector and the drill bit, and the drill bit diameter. The functional relationship may be determined empirically or via mathematical modeling.

In embodiments in which two distinct oxygen activation standards are utilized to determine $O_x\_down$ and $O_x\_up$, the volumetric flow rate Q may be calculated from the down flow and the up flow oxygen activation yields, for example, as follows:

$$Q_{down} = f'(O_x\_down) \quad (2)$$

$$Q_{up} = f''(O_x\_up) \quad (3)$$

where $Q_{down}$ and $Q_{up}$ represent the down flow and up flow volumetric flow rates and f'(·) and f''(·) indicate the functional relationships between the volumetric flow rates and the induced down flow and up flow oxygen activation yields.

It will be appreciated that $Q_{down}$ is generally equal to $Q_{up}$ (assuming that the borehole conditions remain substantially the same as the conditions at which f'(·) and f''(·) were calibrated). Thus, in normal drilling conditions either $Q_{down}$ or $Q_{up}$ may be used to compute a volumetric flow rate of the drilling fluid. It will be further understood that $Q_{down}$ is generally sensitive only to the BHA configuration and is generally insensitive to the borehole conditions. $Q_{up}$, on the other hand, may be sensitive to both the BHA configuration and the borehole conditions.

Figure 8A:
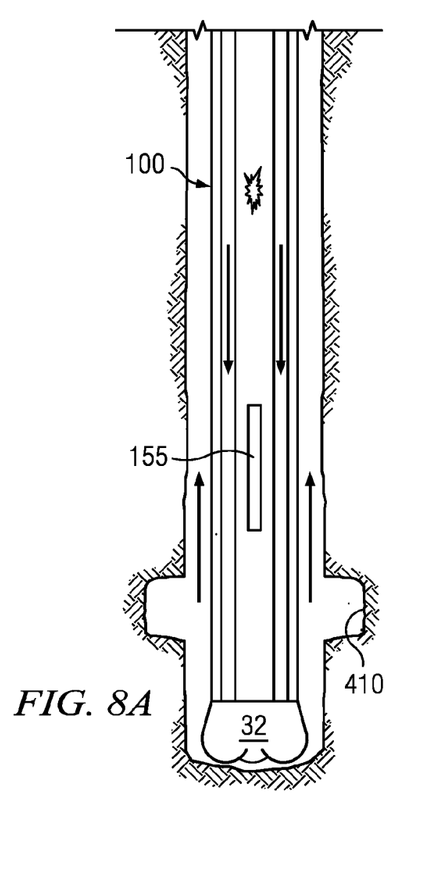
FIGS. 8A and 8B depict schematic deployments of a logging string in borehole enlargement (8A) and lost circulation (8B) conditions.
Figure 8B:
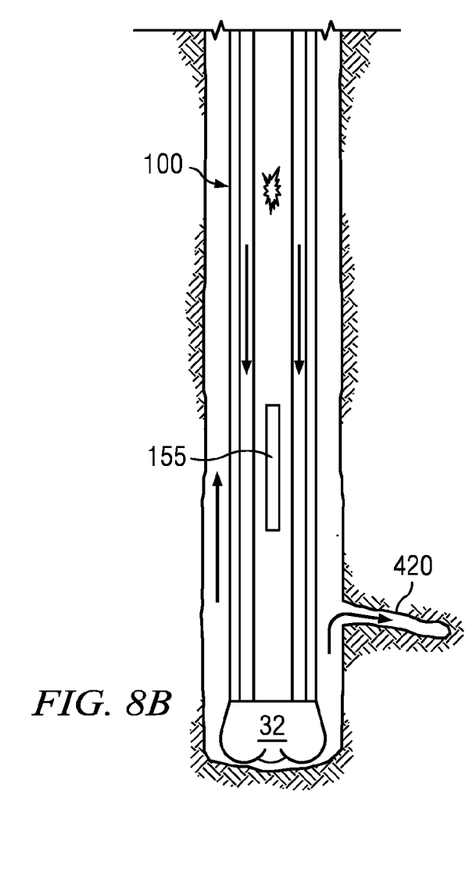

FIGS. 8A and 8B depict schematic deployments of logging string 100 (FIG. 2A) in borehole enlargement (8A) and lost circulation (8B) conditions. With respect to FIG. 8A, a borehole size change such as a washout 410 located between the gamma ray detector 155 and the drill bit 32 may be inferred from a change in the up flow oxygen activation yields. A borehole enlargement, as depicted, tends to reduce the fluid velocity and increase the travel time for activated mud to travel between the drill bit and the gamma ray detector. Thus a decrease in up flow oxygen activation yields may be observed when a borehole washout 410 is located between the drill bit 32 and the gamma ray detector 155. The down flow oxygen activation yield is substantially unaffected by the borehole washout 410 (or other borehole diameter changes). As drilling progresses and the gamma ray detector 155 moves downwards past the washout 410, the up flow oxygen activation yield may return to a normal value. The borehole diameter change and the depth (or length) of the affected region may be quantified (or estimated), for example, from the magnitude of the up flow oxygen activation change and the drilling speed.

With respect to FIG. 8B, lost circulation events (as depicted schematically at 420) in which drilling fluid is lost into the subterranean formation may result in a significant drop in up flow oxygen activation yield with little or no change in down flow oxygen activation yield (e.g., the up flow yield may drop below a predetermined threshold while the down flow yield remains approximately unchanged). In severe lost circulation events, there may be a complete disappearance of up flow oxygen activation.

Figure 9A:
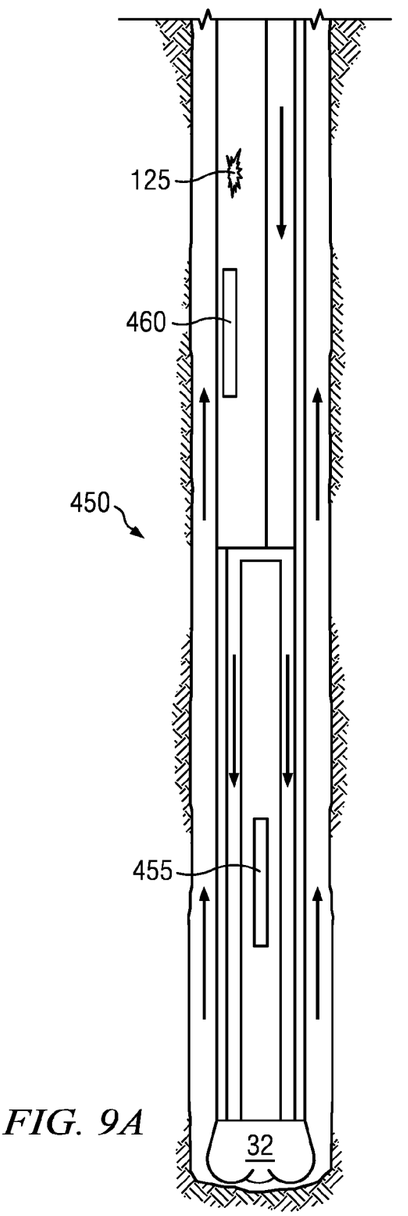
FIGS. 9A and 9B depict alternative logging string embodiments suitable for use with the method embodiment depicted on FIG. 3.
Figure 9B:
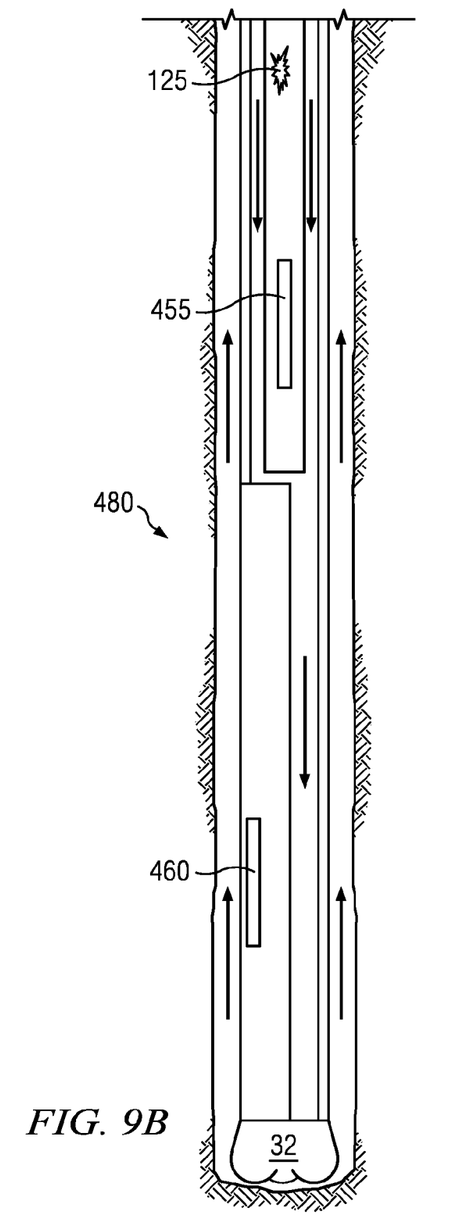

FIGS. 9A and 9B depict alternative logging string embodiments 450 and 480 which are intended combine the advantages of the mandrel based and chassis based configurations 100 and 100' depicted on FIGS. 2A and 2B. Logging string embodiments 450 and 480 are similar in that each includes a neutron source 125 and first and second axially spaced mandrel based and chassis based gamma ray sensors 455 and 460. In FIG. 9A, the chassis based gamma ray sensor 455 is deployed above the mandrel based sensor 460 in closer proximity to the neutron source 125. In FIG. 9B, the mandrel based gamma ray sensor 460 is deployed above the chassis based sensor 455 in closer proximity to the neutron source 125.

While not depicted in the FIGS., it will be understood that a portion of the disclosed method embodiments may be implemented either uphole (e.g., by an operator at the surface or on a surface computer) or downhole (e.g., by a downhole controller deployed in the logging string). The disclosed embodiments are in no way limited in these regards. Moreover, it will be further understood that the aspects and features of the disclosed embodiments may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The disclosed embodiments are not limited in any of these regards.

A suitable downhole controller may include, for example, a programmable processor, such as a microprocessor or a microcontroller and processor-readable or computer-readable program code embodying logic. A suitable processor may be utilized, for example, to execute a portion of the method embodiments described above with respect to FIGS. 3, 5A, and 5B. For example, a downhole controller may be configured to process measured gamma ray spectra to compute oxygen activation yields (counts) which may be further processed to compute drilling fluid flow rates. The yields or flow rates may be optionally transmitted to the surface while drilling (e.g., via known telemetry techniques).

A suitable controller may be further configured to control operation of the gamma ray detector(s) and the neutron generator(s). A suitable controller may also optionally include other controllable components, such as data storage devices, power supplies, timers, and the like and may optionally communicate with other instruments in the drill string, for example, including telemetry systems that communicate with the surface. A suitable controller may further optionally include volatile or non-volatile memory or a data storage device for storing measured gamma ray spectra for further post-processing.

Although mud activation measurement while drilling methods and certain advantages thereof have been described in detail, it should be understood that various changes, substitutions and alternations can be made herein without departing from the spirit and scope of the disclosure as defined by the appended claims.

What is claimed is:

1. A method for estimating a drilling fluid flow rate in a subterranean wellbore, the method comprising:
   (a) deploying a logging string in a subterranean wellbore, the logging string including a neutron source and a gamma ray sensor;
   (b) causing the neutron source to emit neutrons;

(c) causing the gamma ray sensor to acquire a gamma ray spectrum;

(d) processing the acquired gamma ray spectrum in combination with standard elemental spectra and at least one standard oxygen activation spectrum to compute an oxygen activation yield; and (e) processing the oxygen activation yield to estimate the drilling fluid flow rate.

2. The method of claim 1, wherein (d) comprises processing the acquired gamma ray spectrum in combination with standard elemental spectra and first and second standard oxygen activation spectra to compute first and second oxygen activation yields.

3. The method of claim 2, wherein (e) comprises processing the first and second oxygen activation yields to estimate first and second drilling fluid flow rates.

4. The method of claim 3, wherein (e) further comprises processing a change in the first and second oxygen activation yields or the first and second drilling fluid flow rates to estimate a change in borehole diameter.

5. The method of claim 3, wherein (e) further comprises evaluating a change in the first and second oxygen activation yields or the first and second drilling fluid flow rates as an indicator of a borehole diameter change or a lost circulation event.

6. The method of claim 5, wherein a borehole washout event is inferred from a decrease in the second oxygen activation yield or the second drilling fluid flow rate.

7. The method of claim 5, wherein a lost circulation event is inferred when the second oxygen activation yield or the second drilling fluid flow rate drops below a predetermined threshold.

8. The method of claim 2, wherein the first standard oxygen activation spectrum comprises a down flow standard oxygen activation spectrum and the second standard oxygen activation spectrum comprises an up flow standard oxygen activation spectrum.

9. The method of claim 2, wherein the first standard oxygen activation spectrum comprises an average or weighted average of a down flow standard oxygen activation spectrum and an up flow standard oxygen activation spectrum and the second standard oxygen activation spectrum comprises a difference between the down flow standard oxygen activation spectrum and the up flow standard oxygen activation spectrum.

10. The method of claim 1, wherein the standard elemental spectra comprise potassium, uranium, and thorium standard spectrum.

11. The method of claim 1, wherein the acquired gamma ray spectrum is processed using a weighted least squares analysis in (d).

12. The method of claim 1, wherein (c) further comprises summing a plurality of spectra to obtain an average spectrum.

13. The method of claim 12, wherein (d) further comprises:

(i) processing the average spectrum in combination with standard elemental spectra and first and second standard oxygen activation spectra to compute first and second oxygen activation yields;

(ii) processing the first and second oxygen activation yields to compute a mixed standard oxygen activation spectrum; and (iii) processing the gamma ray spectrum acquired in (c) in combination with standard elemental spectra and the standard mixed oxygen activation spectrum to compute a mixed oxygen activation yield.

14. The method of claim 1, further comprising:

(f) evaluating the drilling fluid flow rate estimated in (e) as an indicator of borehole diameter changes or a lost circulation event.

15. The method of claim 1, wherein the drilling fluid flow rate is estimated in (e) using at least one of the following mathematical equations:

$$Q=f(O_x)$$

$$Q_{down}=f'(O_x\_down)$$

$$Q_{up}=f'(O_x\_up)$$

wherein Q, $Q_{down}$, and $Q_{up}$ represent the drilling fluid flow rate and $O_x$, $O_x\_down$, and $O_x\_up$ represent the oxygen activation yield.

16. A method for inferring a borehole diameter change or a lost circulation event while drilling, the method comprising:

(a) deploying a logging string in a subterranean wellbore, the logging string including a neutron source and a gamma ray sensor;

(b) causing the neutron source to emit neutrons;

(c) causing the gamma ray sensor to acquire a gamma ray spectrum;

(d) processing the acquired gamma ray spectrum in combination with standard elemental spectra and first and second standard oxygen activation spectra to compute first and second oxygen activation yields; and (e) processing a change in the first and second oxygen activation yields to infer the borehole diameter change or the lost circulation event.

17. The method of claim 16, wherein (e) further comprises processing the change in the first and second oxygen activation yields to estimate a change in borehole diameter.

18. The method of claim 16, wherein a borehole washout event is inferred from a decrease in the second oxygen activation yield.

19. The method of claim 16, wherein a lost circulation event is inferred when the second oxygen activation yield drops below a predetermined threshold.

20. The method of claim 16, wherein the first standard oxygen activation spectrum comprises a down flow standard oxygen activation spectrum and the second standard oxygen activation spectrum comprises an up flow standard oxygen activation spectrum such that the first and second oxygen activation yields comprise down flow and up flow oxygen activation yields.

* * * * *